United States Patent [19]

DeLiso et al.

[11] Patent Number: 5,356,852
[45] Date of Patent: Oct. 18, 1994

[54] ACTIVATED CARBON STRUCTURES

[75] Inventors: Evelyn M. DeLiso; Irwin M. Lachman; Mallanagouda D. Patil; Kenneth E. Zaun, all of Corning, N.Y.

[73] Assignee: Corning Incorporated, Corning, N.Y.

[21] Appl. No.: 3,794

[22] Filed: Jan. 13, 1993

Related U.S. Application Data

[63] Continuation-in-part of Ser. No. 632,921, Dec. 24, 1990, abandoned.

[51] Int. Cl.$^5$ .......................... B01J 20/28; B01J 20/26; B01J 20/20
[52] U.S. Cl. ........................... 502/402; 96/146; 502/404; 502/417; 502/527
[58] Field of Search ............... 502/402, 404, 401, 417, 502/527

[56] References Cited

U.S. PATENT DOCUMENTS

| | | | |
|---|---|---|---|
| 3,632,385 | 6/1972 | Schmitt et al. | 117/46 |
| 3,825,460 | 7/1974 | Yoshikawa et al. | 156/296 |
| 3,859,421 | 1/1975 | Hucke | 423/445 |
| 3,922,412 | 11/1975 | Yoshikawa et al. | 428/118 |
| 4,386,947 | 6/1983 | Mizuno et al. | 55/387 |
| 4,399,052 | 8/1983 | Sugino | 252/421 |
| 4,518,704 | 5/1985 | Okabayashi et al. | 502/80 |
| 4,664,683 | 5/1987 | Degen et al. | 55/387 |
| 4,999,330 | 3/1991 | Bose et al. | 502/402 |
| 5,043,310 | 8/1991 | Takeuchi et al. | 502/404 |

FOREIGN PATENT DOCUMENTS

| | | | |
|---|---|---|---|
| 0492081 | 7/1992 | European Pat. Off. | 502/416 |
| 55-167118 | 12/1980 | Japan | C01B 31/08 |
| 57-077018 | 8/1982 | Japan | C01B 31/08 |
| 151041 | 6/1991 | Japan | 502/404 |
| 1420479 | 1/1976 | United Kingdom | C01B 31/14 |

*Primary Examiner*—Paul E. Konopka
*Attorney, Agent, or Firm*—Kees van der Sterre

[57] ABSTRACT

Thin-walled honeycomb structures of activated carbon, useful for the adsorption of hydrocarbon vapors are prepared without the need for firing or sintering at elevated temperatures. The structures are prepared by forming a substantially homogeneous batch from an admixture of thermally gellable cellulose ether and/or derivative thereof such as methylcellulose, an additional organic binder such as a polyvinyl alcohol resin, and particles of activated carbon; plasticizing the batch with liquid, extruding the batch into a honeycomb shape; and drying the extruded shape at a temperature up to about 225° C.

22 Claims, No Drawings

ACTIVATED CARBON STRUCTURES

CROSS-REFERENCE TO RELATED APPLICATION

This is a continuation-in-part of application No. 07/632,921 filed Dec. 24, 1990, now abandoned.

BACKGROUND OF THE INVENTION

This invention relates to thin-walled structures (such as extruded honeycombs) of activated carbon, to a method for their preparation, and to their use for the passive adsorption of hydrocarbon vapors. More particularly, the invention relates to such structures that can be made through a method that does not require firing or sintering at elevated temperatures, and to the use of the honeycomb structures as a pollution control device to prevent evaporative emission of hydrocarbons to the atmosphere from, for example, motor vehicle fuel tanks and gasoline pump nozzles.

As part of the pollution control devices now used in automobiles, each automobile is equipped with a canister of activated carbon for the purpose of adsorbing hydrocarbon vapors that are emitted from the fuel tank or from the carburetor by natural evaporation. The hydrocarbon vapors generated while the engine is idle are vented from the fuel tank and carburetor to the canister to be adsorbed on the activated charcoal and thereby charcoal is later purged during engine operation by drawing air through the charcoal via the air intake to the engine.

Although this system is generally effective, it does have drawbacks that are based primarily on the geometric arrangement of the activated charcoal in the canister. As used today, the activated charcoal resides in the canister in the nature of a bed of granulated material. The adsorption capacity of a packed bed, however, is substantially less than theoretical capacity because gas diffusion through a packed bed is not uniform and the gas actually comes into contact with only a minimal portion of the available surface area. Therefore, the practically (as opposed to theoretically) available charcoal becomes saturated and additional hydrocarbon vapors generated pass the charcoal without being adsorbed and are left to be emitted to the atmosphere. Although this problem could be overcome by use of a greater volume of charcoal, the cost and space constraints make such a solution impractical.

An alternative to such a system is the use of a thin-walled honeycomb structure of activated carbon having a plurality of through-and-through channels, which has the advantage of more efficient packing of material per unit volume, providing greater practical surface area for adsorption, than is provided by a bed of granulated material. The use of such a honeycomb for the passive adsorption of evaporative emissions from a fuel tank is shown in U.S. Pat. No. 4,386,947, which discloses a monolithic honeycomb of activated carbon and combinations of activated carbon, a fuel-resistant resin and porcelain for adsorbing evaporative fuel emissions in an automotive anti-pollution system. The activated carbon honeycomb is prepared by making a plasticized batch of the activated charcoal, a water-soluble varnish resin containing a water-soluble imide resin, water, and methylcellulose; extruding a green honeycomb; exposing the honeycomb to progressively higher temperatures from 60° C. through 120° C., followed by heating at 270° C. in a nitrogen atmosphere.

Other methods for preparing activated-carbon honeycombs are also known in the art. For example, Hucke, U.S. Pat. No. 3,859,421, discloses methods of producing carbonaceous bodies by casting a mixture of carbon-yielding binders such as furfuryl alcohol and furfuryl alcohol resins, polymerizing the alcohol by exposure to mineral acids or organic acids, consolidating the mixture by removal of liquids, and pyrolyzing at elevated temperatures to generate carbon.

Sugino, U.S. Pat. No. 4,399,052, discloses the extrusion of a mixture that contains at least one thermosetting organic resin into a honeycomb structure. The structure is then dried to eliminate hydrocarbons and effect carbonization, followed by heating to 600°–1000° C. in an oxidizing atmosphere to form an activated carbonaceous honeycomb body.

Honeycomb structures which can be prepared in a manner that eliminates the need for firing yet which nonetheless have the strength to withstand the vibrations and other stresses attending automotive use are now provided by the present invention.

SUMMARY OF THE INVENTION

The present invention provides a method of preparing a thin-walled structure such as a honeycomb structure. The method requires no firing or sintering steps, but rather is essentially completed simply upon drying the formed or shaped green body or structure at a temperature that does not exceed about 225° C., preferably not above 200° C. Despite the absence of a traditional firing or sintering step, the honeycombs so formed have high strength and structural integrity.

According to the method of this invention, a thin-walled structure of activated carbon is prepared by (1) admixing into a substantially homogeneous mixture particles of (a) activated carbon as the predominant or major constituent of the mixture, (b) a first thermally gellable binder selected from cellulose ethers and derivatives thereof, and (c) a second organic binder selected from the group consisting of polyvinyl alcohol resins, poly(vinylpyrolidone), silicone resins, polyethylene glycol resins, polyethylene oxides, and mixtures of these; (2) adding rheological plasticizing liquid to the mixture in an amount sufficient to plasticize the mixture so as to be plastically formable; (3) extruding the plasticized mixture through a die to form a green (i.e. not dried) shape of the thin-walled structure; and (4) drying the green shape at a temperature up to about 225° C., preferably only up to about 200° C. The invention is also directed to a dried, thin-walled structure, which preferably is a honeycomb, consisting essentially of about 70–100 parts by weight of activated carbon, about 1–15 parts by weight of a first, thermally gelled binder selected from cellulose ethers and derivatives thereof (e.g. methylcelluloses), and about 1–10 parts by weight of a second binder as noted above.

In a preferred embodiment of the invention using polyvinyl alcohol as the second binder, an ether anhydride copolymer is also incorporated into the mixture. The copolymer is capable of cross linking with the polyvinyl alcohol in a reaction that is initiated at or below the drying temperature. The presence of the copolymer in the mixture, and therefore the final honeycomb, imparts additional strength. In still further embodiments of the invention, the mixture contains other inorganic materials generally referred to as fillers, but which may be known for their high porosity, high surface area, and hydrocarbon-adsorptive ability. The fillers include oxides, such as aluminas, silicas, or zeolites or other molecular sieves, carbides, borides, and nitrides.

The invention also provides a dried, thin-walled structure consisting essentially of activated carbon as the predominant or major constituent, a first thermally gellable binder selected from cellulose ethers and derivatives thereof, a second binder selected from the group consisting of polyvinyl alcohol resins, poly(vinylpyrolidone), silicone resins, polyethylene glycol resins, polyethylene oxides, and mixtures of these.

DETAILED DESCRIPTION OF THE INVENTION

The present invention, in one advantageous form, provides a method for preparing a thin-walled honeycomb structure of activated carbon that can be consolidated into a strong integral form without the need for elevated firing or sintering of the green structure. In a particularly desirable form, the present invention is directed to admixing particulate activated carbon, thermally gellable cellulose ethers and derivatives thereof, and the second organic binder into a mixture, along with plasticizing liquid, extruding the plasticized mixture into the desired honeycomb shape, and then drying the batch at a temperature from room temperature up to about 225° C. to form the final honeycomb structure.

According to the method of the invention, a substantially homogeneous dry mixture is made by admixing, according to conventional methods, the three necessary ingredients: (1) activated carbon, (2) a thermally gellable binder selected from cellulose ethers and derivatives thereof, and (3) the second binder.

Activated carbon can be prepared in a two-stage process that involves carburizing a starting organic material followed by an activation step that involves high-temperature oxidation using air, steam, or a mixture of steam and carbon dioxide. The various organic starting materials from which activated carbon can be made are coal-based materials such as carbon black, including Murray-Williams Germantown lampblack, Fisher lampblack #198, and Columbian Carbon Germantown lampblack; or such materials as coconut shells, pecan flour, cherry pit flour, rice hulls, or sawdust; all of which materials are known in the art and commercially available. Activated carbon is characterized by a very high surface area, generally above about 500 $m^2/g$, and a microstructure having a fissured surface and internal microporosity of pore sizes in the range of 2-10 angstroms. A primary tool for the characterization of activated carbon is BET surface area measurement using nitrogen adsorption.

The activated carbon suitable for use in this invention is also commercially available. For example, BPL F3 activated carbon, available from Calgon Corp. in several particle sizes and at different measurements of surface area, can be used. A particularly preferred variety of activated carbon from this source is the "6×16" mesh size, which is available at a surface area of about 1050-1300 $m^2/g$.

The activated carbon as incorporated into the admixture is preferably in a fine particulate form (known as "flour") that is −200 mesh (U.S. standard), more preferably −325 mesh, and most preferably −500 mesh.

The second necessary ingredient of the admixture is a binder selected from thermally gellable cellulose ethers and derivatives thereof which acts as a plasticizer to aid the extrusion and provides wet strength to maintain structural integrity of the extruded green shape. These binders are selected from the group consisting of methylcellulose, hydroxybutylcellulose, ethylcellulose, hydroxybutylmethylcellulose, hydroxyethylcellulose, hydroxymethylcellulose, hydroxypropylcellulose, hydroxypropylmethylcellulose, hydroxyethylmethylcellulose, and mixture thereof. Preferred sources of binders selected from such cellulose ethers and derivatives thereof are the Dow Chemical Company's line of Methocel products such as Methocel MC-4000, and its hydroxypropylmethylcellulose K75M.

The third necessary ingredient of the admixture is another binder that is soluble or dispersible with water and/or organic liquid in the mixture. This additional binder and the cellulose ether and/or derivative binder act to serve as permanent binders. This means that they are essentially not removed by a heat treatment. Organic binders are usually completely removed by a firing heat treatment in ceramic technology. However the product of this invention keeps binder in place permanently. Therefore these permanent binders act as a glue to hold the activated carbon particles together. The additional binders preferably have a molecular weight of at least about 2,500 and more preferably at least 4,000 g/mole. Examples of suitable materials to be used as these additional binders are poly(vinylpyrolidone); silicone resins, such as Dow Corning's Q6-2230 silicone resin; polyethylene glycols, such as Carbowax 4000 and Carbowax 20M from Union Carbide Corporation; polyethylene oxides; polyvinyl alcohol resins; and mixtures of these.

The most preferred organic binder is a polyvinyl alcohol ("PVA") resin, preferably one soluble in cold water. PVA in general is made by hydrolyzing polyvinyl acetate to convert the pendant acetate groups to hydroxyl groups. If 100% conversion takes place, however, the PVA will generally not be soluble in cold water. It is preferred that the PVA be about 80-95% hydrolyzed, preferably about 85-90% hydrolyzed, and most preferably about 87-89% hydrolyzed, so that cold-water solubility is retained.

Suitable PVA binders are the Air Products Company's line of Airvol resins, examples of which are shown in the table below:

| Brand name | Viscosity grade | Molecular weight | Percent Hydrolyzed | pH |
| --- | --- | --- | --- | --- |
| Airvol | | | | |
| 203S | low | 11–31,000 | 87–90 | 4.5–6.5 |
| 205S | low | 11–31,000 | 87–90 | 4.5–6.5 |
| 523S | medium | 77–99,000 | 87–90 | 4.0–6.0 |
| 540S | high | 106–110,000 | 87–90 | 4.0–6.0 |

Preferred among the PVA materials are those of relatively low viscosity having a molecular weight of about 7,500-50,000, more preferably in the range of about 11,000-31,000 g/mole, such as the particular products identified above. A particularly preferred product is the Airvol 205S PVA. 20 The relative weights of the three necessary ingredients in the admixture are generally about 70-100 parts of activated carbon, about 1-10 parts of second binder (e.g. PVA), and about 1-15 parts of a methylcellulose. A preferred range is about 2-10 parts of a methylcellulose, about 2-5 parts of second binder, and about 85–100, more preferably about 90–96, parts of activated carbon.

Optionally, an ether anhydride copolymer capable of cross-linking with the second binder selected can also be added to the admixture. Most preferably the second binder to which the copolymer will be added is PVA. The copolymers are generally soluble, dispersible, or emulsifiable in water and are often commercially available in such form. Preferred copolymers have a molecular weight of about 20,000 to 80,000 g/mole. A preferred copolymer is poly(methyl vinyl ether/maleic anhydride) at a molecular weight of 41,000 g/mole, available as Gantrez AN-139 from GAF Corp. Other suitable copolymers are Witcobond XW from Witco Corporation and Daubond 492×6213 from Daubert Chemical Co., Inc. The presence of the copolymer aids in imparting green strength to the extruded shapes made from the batch admixture. As an extruded shape made from an admixture containing the copolymer approaches about 125° C., during the drying step, the copolymer crosslinks with the PVA, or other binder, crosslink providing additional strength, particularly cold-crushing strength, to the product. Preferably this crosslinking can occur at a temperature of about 100° C. or less. The copolymer is generally present in molar ratio to the organic binder of about 1:1 to about 5:1. In a particularly preferred combination, poly(methyl vinyl ether/maleic anhydride) is present in a molar ratio of about 3:1 to PVA.

Various fillers can also be added to the original mixture in order to impart specific characteristics or properties to the shaped and/or dried structure. For example, the addition of silica gel will increase the surface area in the polymerized body. Examples of suitable fillers are alumina, silica, spinels, titania, zirconia, zeolites, other molecular sieves, and mixtures thereof. Preferably the oxides are calcined oxides having a surface area of at least about 50 m$^2$/gm, more preferably at least about 100 m$^2$/g, for applications requiring high surface area. Other suitable fillers include nitrides, borides, and carbides, such as nitrides or carbides of silicon or titanium. Fillers can be present in an amount up to about 75% by weight, preferably about 20–50% by weight, of the total weight of the admixture. Formation of the admixture, with proper dispersion of the fillers, is enhanced by the addition of up to 3% by weight of a surfactant or dispersant. A preferred such material is sodium stearate.

The admixture and the extruded green honeycomb are prepared by conventional techniques using conventional equipment. For example, the dry ingredients are first admixed and blended into a substantially homogeneous batch by use of, for example, a ball-mill or a high intensity Littleford mixer. This is followed by addition of rheological plasticizing liquid as is well known, e.g. water, in amount sufficient to provide proper plasticization of the mixture. In those cases where some or all of the binders are not soluble in water, organic solvents such as alcohols, ketones, alkanes, esters, etc. may be used singly or in combination as the liquid or the liquid can be an admixture of water and the organic solvent. Where the water-borne epoxy resin is present, the water used as carrier for the epoxy is often sufficient for this purpose, but can be supplemented with additional water. Moreover, when the epoxy is used, it is preferred to first admix the epoxy and resinous binder separately and then combine this admixture with the remaining dry ingredients and whatever additional water is to be used.

This resulting admixture is then plasticized in a mixmuller, kneader, or double-arm mixer. Following this plasticization step, the batch can then be extruded through a "noodling" or spaghetti die one or more times to effect further mixing and to substantially homogenize the batch. Ultimately, the batch is formed into the desired shape by extrusion through a die capable of forming a thin-walled structure such as a honeycomb, ribbon, or other die of desired configuration. The preferred structure for the present invention is a thin-walled honeycomb having at least four, preferability at least 100, more preferably at least 200, and most preferably at least 400, through-and-through channels per square inch (or respectively 15.5, 31, and 62 cells per square centimeter) of frontal surface area, and a wall thickness of about 3–300 mils (0.08–7.6 mm).

Following extrusion, the structures are dried in an oven at a temperature at or below about 225° C., preferably below about 200° C., and most preferably in the range of about 90°–170° C., for a period of about 1–5 days. This procedure can be carried out in air in a programmable electric kiln oven. The temperature of the extruded structure is generally raised slowly to the drying temperature, at a rate of about 25° C./hour or less, to prevent breakage. Following the first drying step, the structure can optionally be heated further in an atmosphere of $CO_2$, $N_2$, steam, or a combination of these at a temperature of about 175°–225° C., preferably about 150°–200° C., for a period of 1–10 hours. This procedure increases the available surface area in the structure for hydrocarbon adsorption.

EXAMPLE 1

A batch consisting of 4 weight percent K75M hydroxypropylmethylcellulose, 2 weight percent PVA as a dry powder (Airvol 203S), and balance BPL F3 activated carbon (−200 mesh) were dry-mixed in a Littleford mixer for three minutes. The dry ingredients were then charged to a Muller Mixer to which was added sufficient water to form a homogeneous, plasticized batch. Mixing time was about 30 minutes. Honeycombs of 1-inch (2.54 cm) diameter were extruded with a 25-ton extrusion press and cut to a length of one inch (2.54 cm). The die geometry was varied to provide honeycombs having 200 cells/in$^2$ (31 cells/cm$^2$) with 15-mil (0.38 mm) wall thickness, 200 cells/in$^2$ (31 cell/cm$^2$) with 20-mil (0.51 mm) wall thickness, and 400 cells/in$^2$ (62 cells/cm$^2$) with 6-mil (0.15 mm) wall thickness. All samples were dried in an oven at 100° C. for three days, but batch composition CR-170, shown below, was held an additional day at 150° C.

The extruded honeycomb samples were characterized for BET surface area (SA) using nitrogen adsorption and tested for cold-crushing strength (average of 10 samples). The cold-crushing strength was determined by mounting a sample measuring one inch (2.54 cm) in diameter and one inch (2.54 cm) thick between two steel platens and applying an increasing mechanical load, utilizing a crosshead speed of 0.04 inches/minute (1.02 mm/min), until the sample failed. The load at failure was recorded. Results are reported below.

| Batch # | SA of Activated Carbon (raw material) (m²/g) | SA of dried honeycomb (m²/g) | Geometry (x/y)* | cold crushing strength (psi) | MPa |
| --- | --- | --- | --- | --- | --- |
| CI-170-1 | 1300 | 1130 | 400/6 | 634 | 4.37 |
| CI-170-2 | 758 | 646 | 400/6 | 184 | 1.27 |
| CR-170 | 1060 | 922 | 200/15 | 164 | 1.13 |

*x = cells/in²; y = wall thickness (mils)

EXAMPLE 2

Three additional honeycombs were prepared according to the description and ingredients for Batch CI-170-2 of Example 1 except that the particular PVA resins used in the three additional batches were varied in order to determine the effect of different PVA resins on the surface area and cold crushing strength of the dried honeycombs. In all four samples of this example, the extruded honeycombs had 400 cells per square inch (62 cells/cm²) and walls of 6-mil (0.15 mm) thickness and were one inch (2.54 cm) in diameter and in length. All samples were dried in an oven at 100° C. for three days. Results are reported in the table below.

|  | CI-170-2 | CL-170 | CM-170 | CN-170 |
| --- | --- | --- | --- | --- |
| PVA (Airvol resin) | 203S | 205S | 523S | 540S |
| SA (m²/g) | 646 | 654 | 651 | 646 |
| cold crushing strength (psi) | 184 | 254 | 184 | 190 |
| strength (MPa) | 1.27 | 1.75 | 1.27 | 1.31 |

EXAMPLE 3

The honeycomb of batch CI-170-1, as described in Example 1, was comparison-tested for hydrocarbon adsorption with a packed bed of particulate activated carbon (BPL F3 -200 mesh, surface area 1230 m²/g) by placing the test samples into a sealed chamber having inlet and outlet ports. A gas stream of nitrogen with 500 ppm n-butane was introduced to the sample at a flow rate of 4016 cc/minute, and adsorption was measured by monitoring the exit gas stream with a flame ionization hydrocarbon detector. Adsorption was considered complete when the samples were saturated, as indicated when the exit stream composition matched that of the inlet stream. At this time, the inlet gas stream was changed to nitrogen with 5% hydrogen, and desorption of the hydrocarbon measured. The detector readings were plotted versus time and the adsorption and desorption were measured by integrating the area of each curve. The values reported in the table below for adsorption/desorption represent milligrams of hydrocarbon adsorbed/desorbed divided by the sample weight before testing.

| Sample ID | Test time (min.) | SA (m²/g) | cold crushing strength (psi) | MPa | HC Adsorption (mg/gm) | HC Desorption (mg/gm) |
| --- | --- | --- | --- | --- | --- | --- |
| BPL F3* | 110 | 1230 | — | — | 26.7 | 29.4 |
| CI-170-1 | 200 | 1130 | 634 | 4.37 | 61.5 | 39.4 |
|  | 380 | 1130 | 634 | 4.37 | 87.0 | 67.2 |

*packed bed

EXAMPLE 4

A water emulsion of PVA and poly(methyl vinyl ether/maleic anhydride) was prepared by admixing Airvol 205S PVA and Gantrez AN-139, both in the form of dry powder, in a molar ratio of about 1:3, into water at a temperature of about 95°–99° C. Ten weight parts of the Gantrez AN-139 were first added to 90 parts of water, which was being stirred at a rate sufficient to produce a whirling vortex. Post-addition stirring Was continued until the solution, which initially became a thick gel, broke down to form a clear liquid. The Airvol 205S was then admixed into this solution while stirring was continued. The resulting emulsion was held in a closed container overnight. One hundred sixty seven weight parts of this emulsion were then admixed with about 100 weight parts of activated carbon (−200 mesh BPL F3, surface area 1060 m²/g and about 6 weight parts K75M methylcellulose in a muller mixer. Mixing was continued for 20 minutes. The resulting plasticized batch was extruded into honeycombs having 200 cells per square inch (31 cells/cm²) with a wall thickness of 15 mils (0.38 mm). Honeycomb samples were one inch (2.54 cm) in diameter and one inch (2.54 cm) long. The extruded honeycombs were dried at 100° C. for 24 hours and further dried at 200° C. for 4 hours in a $CO_2$ atmosphere. The BET surface of the honeycombs was 650 m²/g and cold crushing strength was 2620 psi (6.88 MPa).

EXAMPLE 5

Polyvinylpyrrolidone (PVP). PVP K-30 was obtained from ISP Technologies, Inc., formerly GAF. PVP K-30 was a white powder. PVP K-30 was dissolved in the batch water and the resulting solution was added to the dry mixture of activated carbon containing 6 weight percent of hydroxypropylmethylcellulose in the Mueller mixer. The plasticized mixture was extruded through a die to form a honeycomb, which was then dried as described above.

EXAMPLE 6

A batch consisting of activated carbon with 15 weight percent silicone resin and 6 weight percent hydroxypropylmethylcellulose was mixed, plasticized with liquid, extruded, and dried as described previously. The 100% silicone resin was in a flake form was Dow Corning 6-2230 Resin. The liquid for the extrusion batch was a 50:50 mixture of ethanol and $H_2O$.

What is claimed is:

1. A method of making a thin-walled honeycomb structure of activated carbon material comprising the steps of (1) admixing into a substantially homogeneous mixture (a) 70–100 parts by weight of particulate activated carbon, (b) 1–15 parts by weight of a first, thermally gellable binder selected from cellulose ethers and derivatives thereof, and (c) 1–10 parts by weight of a second binder selected from the group consisting of polyvinyl alcohol resins, poly(vinylpyrolidone), silicone resins, polyethylene glycol resins, polyethylene oxides, and mixtures of these;

(2) adding a plasticizing liquid selected from the group consisting of water, organic solvents, and mixtures thereof to the mixture in an amount sufficient to plasticize the mixture;

(3) extruding the plasticized mixture through a die to form a green honeycomb shape of the thin-walled structure; and (4) drying the green honeycomb structure at a temperature up to about 225° C. to form the thin-walled honeycomb structure.

2. The method of claim 1 wherein said cellulose ether binder is selected from the group consisting of methylcellulose, ethylcellulose, hydroxybutylcellulose, hydroxybutylmethylcellulose, hydroxyethylcellulose, hydroxymethylcellulose, hydroxypropylcellulose, hydroxypropylmethylcellulose, hydroxyethylmethylcellulose, and mixtures thereof.

3. The method of claim 2 wherein the second binder is a polyvinyl alcohol resin.

4. The method of claim 1 wherein the drying step is performed at a temperature up to about 200° C.

5. The method of claim 3 wherein the drying step is performed at a temperature up to about 200° C.

6. The method of claim 1 wherein the batch comprises about 1–15 weight parts of methyl cellulose, about 1–10 weight parts of polyvinyl alcohol, and about 70–100 weight parts of activated carbon.

7. The method of claim 6 wherein the polyvinyl alcohol is about 80–95% hydrolyzed.

8. The method of claim 7 wherein the activated carbon is in a particulate form finer than about 200 mesh.

9. The method of claim 1 wherein the batch additionally comprises an ether anhydride copolymer and wherein said resinous binder is capable of crosslinking with the copolymer during said drying step.

10. The method of claim 6 wherein the batch additionally comprises an ether anhydride copolymer capable of cross linking with said polyvinyl alcohol during said drying step.

11. The method of claim 10 wherein said copolymer is a poly(methyl vinyl ether/maleic anhydride) resin and is present in a molar ratio to polyvinyl alcohol of about 1:1 to 5:1.

12. The method of claim 11 wherein the batch comprises about 2–10 weight parts of methylcellulose, about 2–5 weight parts of polyvinyl alcohol, and about 85–100 weight parts of activated carbon.

13. The method of claim 12 wherein said drying step comprises the sub-steps of drying the extruded structure in air at a temperature of about 90°–170° C., followed by further drying said structure in an atmosphere of steam, nitrogen, carbon dioxide, or a mixture of these at a temperature up to about 225° C.

14. The method of claim 1 wherein the mixture further contains up to about 75% by total weight of a filler selected from the group consisting of silica, alumina, spinels, titania, zirconia, zeolites, other molecular sieves, nitrides, borides, carbides and mixtures thereof.

15. A honeycomb structure produced by the method of claim 1.

16. A honeycomb structure produced by the method of claim 15.

17. A honeycomb structure produced by the method of claim 6.

18. A honeycomb structure produced by the method of claim 7.

19. A honeycomb structure produced by the method of claim 9.

20. A honeycomb structure produced by the method of claim 10.

21. A honeycomb structure produced by the method of claim 11.

22. A honeycomb structure produced by the method of claim 12.

* * * * *

UNITED STATES PATENT AND TRADEMARK OFFICE
CERTIFICATE OF CORRECTION

PATENT NO. : 5,356,852
DATED : October 18, 1994
INVENTOR(S) : Evelyn M. DeLiso; Irwin M. Lachman; Mallanagouda D. Patil; Kenneth E. Zaun It is certified that error appears in the above-indentified patent and that said Letters Patent is hereby corrected as shown below:

Col. 1, line 30, after "thereby" insert "prevented from being emitted to the atmosphere. The"

Col. 3, line 18, "thin-wailed" should be "thin-walled"

Col. 4, line 63, after "PVA." delete "20"

Col. 4, line 63, start new paragraph at "The"

Col. 10, line 29, "15" should be "14"

Signed and Sealed this

Third Day of January, 1995

*Attest:*

BRUCE LEHMAN

*Attesting Officer*     *Commissioner of Patents and Trademarks*